United States Patent [19]

Boersig

[11] 3,755,835
[45] Sept. 4, 1973

[54] WHEELED BOAT

[76] Inventor: Harry R. Boersig, 8715 Dolly Madison S.W., Tacoma, Wash. 98498

[22] Filed: Aug. 13, 1971

[21] Appl. No.: 171,509

[52] U.S. Cl. .................................................. 9/1 T
[51] Int. Cl. ............................................ B63c 13/00
[58] Field of Search ................. 9/1 T; 115/1 R, 1 A; 280/414 A; 180/74

[56] References Cited
UNITED STATES PATENTS

| 1,002,661 | 9/1911 | Erikson | 115/1 A |
| 1,641,574 | 9/1927 | Chavez | 115/1 R |
| 3,131,666 | 5/1964 | Sessions | 115/1 R |
| 3,421,472 | 1/1969 | Oberg | 115/1 R |
| 3,584,592 | 6/1971 | Perrine | 115/1 A |
| 3,306,249 | 2/1967 | Chase | 115/1 R |
| 2,861,643 | 11/1958 | Wald et al. | 180/74 |

Primary Examiner—Milton Buchler
Assistant Examiner—Douglas C. Butler
Attorney—Robert W. Beach

[57] ABSTRACT

A runabout boat has a tricycle undercarriage retractable for travel of the boat in water, and extendable for transporting the boat on land, either self-propelled or as a trailer. The undercarriage includes a single forward wheel mounted on a strut swingable about a transverse axis to move the wheel between raised retracted position within the hull, and lowered position projected below the hull. In projected position, the wheel is steerable by the boat's steering wheel. Two rear wheels are supported by struts for swinging between retracted positions in wheel wells above the hull bottom and two projected positions extending partially below the hull, in one of which positions the wheels are free-wheeling, and in the other of which projected positions the wheels are power-driven by friction gears. Skid fins are mounted for projection when the rear wheels are retracted, and for retraction when the rear wheels are projected.

6 Claims, 7 Drawing Figures

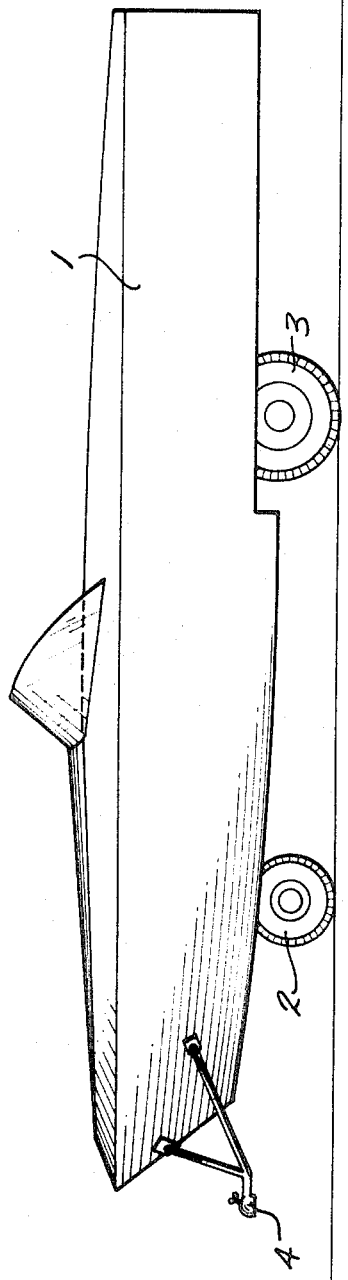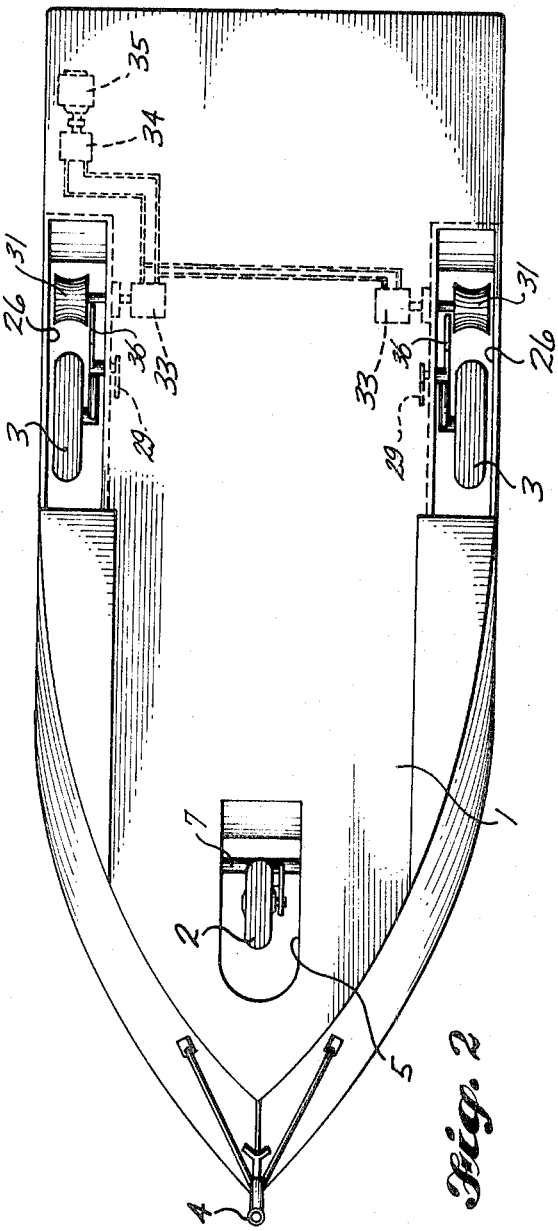
INVENTOR,
HARRY R. BOERSIG
BY
Robert W. Beach
ATTORNEY

INVENTOR,
HARRY R. BOERSIG
BY
Robert W. Beach
ATTORNEY

PATENTED SEP 4 1973 3,755,835

INVENTOR,
HARRY R. BOERSIG
BY
Robert W Beach
ATTORNEY

WHEELED BOAT

A principal object of the present invention is to provide a wheeled undercarriage for a runabout boat the wheels of which are retractable above the waterline; and one or more wheels of the undercarriage can be disposed selectively in a position for free-wheeling when the boat is being towed as a trailer, and for being powered for self-propelling the boat.

A further object is to provide a retractable wheel for a boat undercarriage which is steerable by the boat operator when it is projected, and preferably by manipulation of the same steering wheel used to swing the boat's rudder.

A further object is to provide convenient mechanism for moving wheels of the undercarriage between retracted and projected positions, and particularly, to move such wheels between a projected free-wheeling position and a projected powered position. Another object is to provide convenient mechanism for powering a wheel or wheels of a boat undercarriage.

FIG. 1 is a side elevation of a runabout boat having a wheeled undercarriage with the wheels in projected positions, and FIG. 2 is a bottom plan of such a boat.

Figure 5:
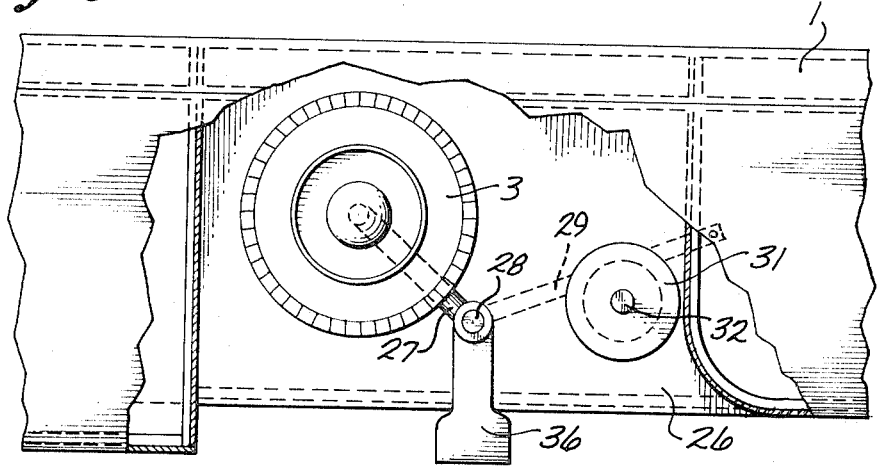
Figure 6:
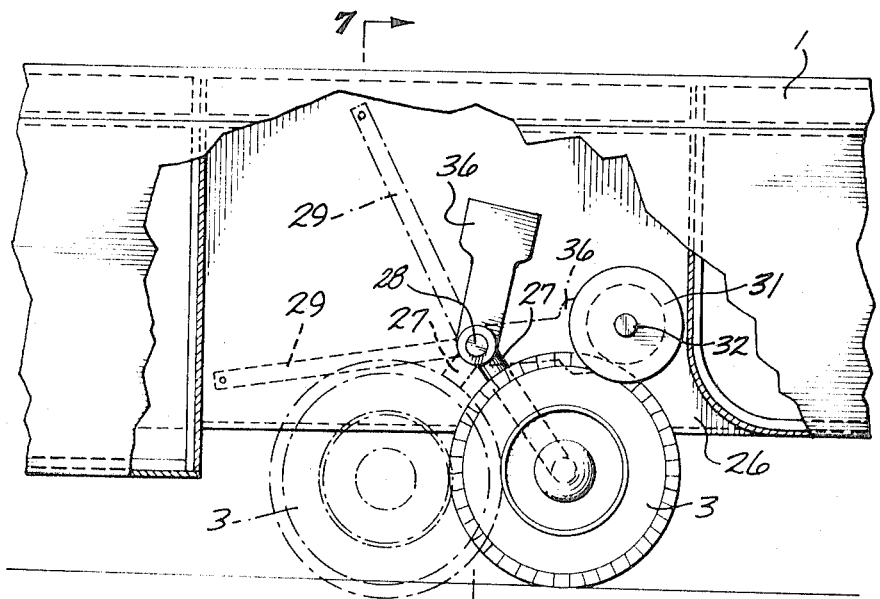
Figure 7:
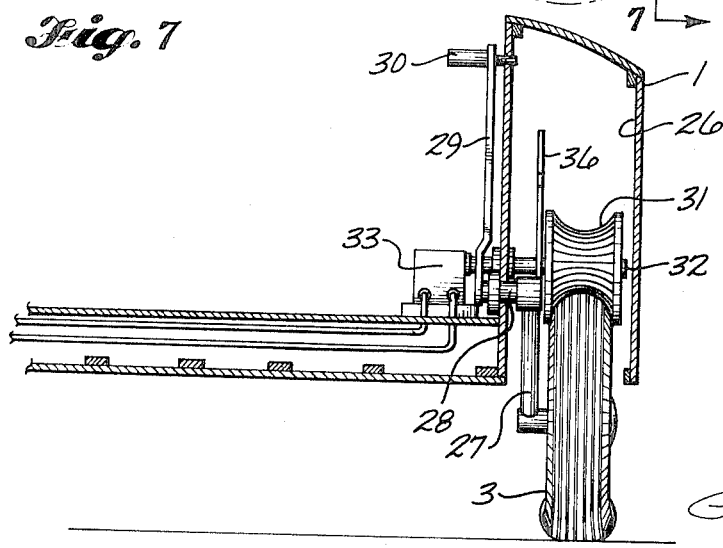

FIG. 5 is an enlarged side elevation of a midships portion of a runabout boat equipped with an undercarriage according to the present invention, parts being broken away, and undercarriage structure being shown in retracted position. FIG. 6 is a similar view with the undercarriage structure being shown in projected position. FIG. 7 is a fragmentary transverse section through a portion of the boat taken on line 7—7 of FIG. 6.

While the undercarriage of the present invention having retractable wheels can be incorporated in boats of various types, it is particularly well adapted to be incorporated in boats of the runabout type, which usually are from 16 feet to 25 feet in length, and in most instances, are from 18 feet to 22 feet in length. It is customary to transport such runabout boats overland on trailers towed by automotive vehicles. Frequently, however, it is difficult to load such a boat onto a trailer and to remove it from a trailer. In many instances, hoisting mechanism is used for launching such a boat from a trailer, and for loading the boat onto the trailer again. Also, if such a boat is to be stored only a short distance from the water, the same amount of work is required to load the boat onto a trailer and subsequently to unload it, as would be required if the boat were to be moved a considerable distance overland.

The wheeled undercarriage according to the present invention enables a boat to be self-propelled readily out of the water onto land and then to be towed as a trailer, if desired, and also to be launched readily into water and to be prepared for water navigation easily after the boat has been transported overland for either a short distance or a long distance. Also, while the boat undercarriage according to the present invention might have four wheels, it is preferred that it be of the tricycle type, and a wheeled undercarriage of this type has been shown in the drawings.

In FIG. 1, the runabout boat has a hull 1, the bow portion of which carries a single forward wheel 2. Two rear wheels are mounted on the boat hull 1 a short distance aft of its center, and generally in the midships section of the boat hull, but preferably somewhat aft of its center of gravity. It is preferred that a larger proportion of the weight of the boat be carried by each of the rear wheels 3 than by the forward wheel 2 because it is preferred that the rear wheels be powered for self-propelling the boat overland. To enable the rear wheels to carry such greater load, it is also preferred that each of the rear wheels 3 be larger than the forward wheel 2, as shown in FIGS. 1 and 2.

In order to enable the boat hull 1 to be towed as a trailer when it is supported on its wheeled undercarriage, a bracket 4 can be secured to the bow of the hull for attachment to a trailer hitch of an automotive vehicle. It is preferred that such bracket be secured to the boat hull so that it can be detached readily after the boat has been towed to its launching location, and can be installed on the boat hull again when it is desired to tow the boat away from a beaching location.

Figure 3:
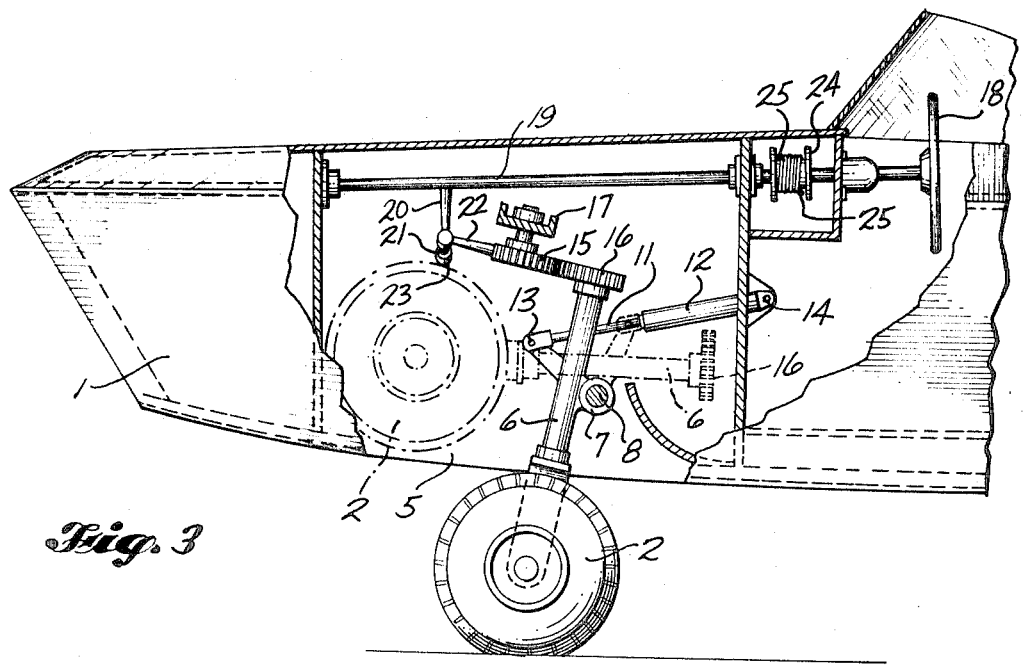
FIG. 3 is a side elevation of the bow portion of a boat on an enlarged scale having a wheeled undercarriage according to the present invention, parts being broken away.
Figure 4:
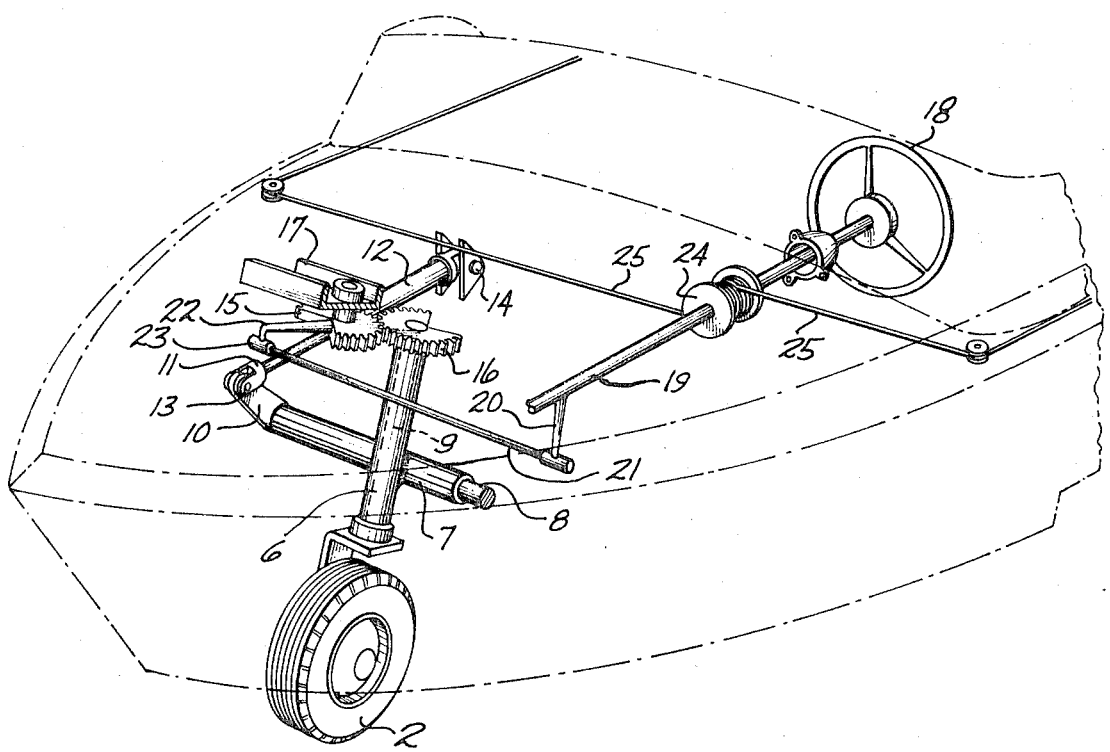
FIG. 4 is a top perspective of the forward portion of the undercarriage with the bow portion of the boat being shown in phantom.

FIGS. 3 and 4 show preferred structure for mounting the forward wheel 2 so that it can be retracted into a wheel well 5 in the bow portion of the boat from the projected boat-supporting position shown in full lines in FIGS. 3 and 4. The wheel is supported on a wheel mount at the lower end of a strut 6 which is carried by a sleeve 7 having its length extending athwartships of the boat. The central portion of such sleeve is secured, such as by welding, to the central portion of the strut. Such sleeve is rotatable on a transverse shaft 8, the opposite ends of which are suitably mounted in the bow portion of the boat hull to transmit the weight of the hull through the shaft sleeve 7 and strut 6 to the wheel 2. While the load of the boat weight is transmitted from the sleeve 7 and strut 6 directly to the mounting of wheel 2, such wheel mounting is not secured rigidly to the strut; but the strut is hollow and has a steering shaft 9 extending through it which is connected to the wheel mount.

To retract the forward wheel 2 from the projected position shown in solid lines in FIGS. 3 and 4 to the retracted position within the wheel well 5 shown in dot-dash lines in FIG. 3, the sleeve 7 is rotated on the transverse shaft 8. Such rotation is effected by swinging sleeve-rotating horn 10 secured to one end of the sleeve, as shown in FIG. 4. Swinging of the horn is effected by reciprocation of a plunger 11 by retraction of a fluid pressure jack 12. The plunger is connected to the swinging end of the horn 10 by pivot 13, and the jack is connected to the boat hull by pivot mounting 14. While the hydraulic jack 12 is the preferred type of actuator to reciprocate plunger 11, such plunger could be a screw reciprocated by rotation of a nut threaded on it and held against axial movement.

When the forward wheel 2 is in the projected position shown in solid lines in FIGS. 3 and 4, a driven gear sector 16 secured to the upper end of steering shaft 9 meshes with driving gear sector 15 which rotates the gear 16 and shaft 9 to swivel the wheel. The driving gear sector 15 is supported stationarily from the boat hull 1 by a suitable mounting bracket 17. The driven gear sector 16, however, is carried by the steering shaft 9 to swing with the forward wheel strut 6 as it swings from the solid-line position of FIG. 3 to the broken-line position of that figure.

Rotation of the driving gear sector 15 for steering purposes when the gear sectors 15 and 16 are in mesh, as shown in FIGS. 3 and 4, is effected by turning the steering wheel 18 mounted on the end of steering column 19. Such steering column carries the steering arm 20, which is connected by a ball joint to one end of the drag link 21 extending athwartships of the boat. The opposite end of such drag link is connected by a ball joint 23 to an arm 22 projecting radially from the driving gear sector 15.

Rotation of steering wheel 18 will turn steering column 19 to swing the steering arm 20 for shifting drag link 21 lengthwise to swing arm 22 for turning the driving gear sector 15, which turns the driven gear sector 16 correspondingly and effects turning of the steering shaft 9 and the wheel mount to which it is connected. Preferably the forward wheel 2 is steered by the same steering wheel that is turned to swing the rudder of boat 1 for maneuvering it in the water. For this purpose, the cable drum 24, on which the rudder cables 25 are wound, is mounted on and secured to the steering column 19 to turn with it as it is turned by manipulation of the steering wheel 18.

Swinging of the boat rudder effected by the cables 25 when the bow portion of the boat is supported by the forward wheel 2 will not interfere with manipulation of the wheel 18 to steer the ground-engaging wheel 2, because, at that time, the rudder is either out of the water or the boat is being self-propelled through shallow water at such a slow speed that such movement through the water does not exert any appreciable force on the rudder. On the other hand, connection of the steering column 19 to the gear 15 for steering the ground-engaging wheel 2 does not interfere appreciably with manipulation of the steering wheel 18 to swing the boat rudder when it is underway in the water. Under such circumstances, the forward ground-engaging wheel 2 and its strut 6 will have been swung from the solid-line position to the dot-dash line position of FIG. 3, in which the driven gear sector 16 has been swung out of mesh with the driving gear sector 15. Rotation of the steering wheel 18 under these conditions will simply swing the steering arm 20 to reciprocate the drag link 21 for swinging arm 22 to rotate driving gear 15. The additional load on the steering wheel 18 over that required to swing the rudder will therefore result only from the friction between the steering arm 20 and the drag link 21, the friction of the pivot connection 23, and the friction of the rotatable mounting for gear sector 15. The force which would be required to overcome such friction is negligible.

While the structure for steering the forward wheel 1 has been described as including the meshing gear sectors 15 and 16, the forward wheel could be steered by substituting for such gearing a hydraulic steering motor which could be connected to the steering shaft 9 by a lever arm. The hydraulic steering motor would be energized by rotation of the steering column 19 effected by turning the wheel 18. Such hydraulic motor would be driven by fluid under pressure supplied by a suitable hydraulic pump.

The rear wheels 3 are mounted for retraction upward into and for projection downward beyond the rear wheel wells 26 in the opposite sides of the boat hull 1, as shown in FIGS. 2, 5, 6 and 7. Each rear wheel is rotatably mounted on the swinging end of a strut 27, the opposite end of which is secured on a strut axle 28 so that the strut projects substantially radially from such axle. Each of these strut axles is suitably mounted in cantilever fashion on the boat hull at the inner wall of the wheel well 26, to rotate through an angle of approximately 180°. Such axle mounting must be sufficiently rugged to transmit most of the weight of the boat to the two wheel struts 27.

Each wheel-mounting strut 27 and the ground-engaging wheel 3 carried thereby can be swung between the solid-line position shown in FIG. 5 and the solid-line position shown in FIG. 6 by swinging a lever 29 rotatably secured to the strut axle 28. Such lever can be swung manually by grasping a handle 30 mounted on the swinging end of the lever, which handle is also reciprocable axially for the purpose of retracting and projecting a latch pin into a suitable aperture in the inner wall of the well 26 to hold the strut axle 28 in a desired selected rotative position for securing the wheel strut 27 and wheel 3 in the corresponding swung position.

When the axle rotating lever 29 has been swung aft as far as possible, as shown in broken lines in FIG. 5, the rear wheel strut 27 will be in the upwardly and forwardly inclined attitude shown in FIG. 5, to locate the ground-engaging wheel 3 fully in the wheel well 26, and preferably above the water line of the boat for travel of the boat in the water. In order to make the boat self-propellable for overland travel, the lever 29 will be swung from the broken-line position of FIG. 5, as far forward as possible to the generally horizontal broke-line position of FIG. 6. Such swinging of the lever will rotate the strut axle 28 to swing the rear wheel strut 27 and ground-engaging wheel 3 into the solid-line projected ground-engaging position of FIG. 6.

When the rear wheel 3 is in the projected solid-line position of FIG. 6, its periphery will be in engagement with the complemental periphery of the friction gear drive wheel 31. Such drive wheel is rotatably mounted by a rotatable axle 32 mounted in cantilever fashion in the inner wall of the wheel well 26. The inner end of such axle can be power-rotated by a hydraulic motor 33 connected directly to it. The hydraulic motors for both rear wheel friction drives can be driven by the same hydraulic pump 34 that is powered by an electric motor or auxiliary air-cooled engine 35 or by a power take-off from the main propulsion engine within the hull 1, which pump and motors are shown in broken lines in FIG. 2.

When it is desired to beach the boat 1, both levers 29 will be swung from their broken-line positions of FIG. 5 to their extreme forward positions of FIG. 6 for projecting the gound-engaging wheels 3 from their retracted positions, shown in full lines in FIG. 5, to their powered positions, shown in full lines in FIG. 6. Also, the jack 12 will be energized to project the plunger 11 for swinging the horn 10 to swing the front wheel strut 6 and front wheel 2 from the broken-line position of FIG. 3 into the solid-line position of that figure and of FIG. 4. The electric motor 35 can then be energized to turn hydraulic pump 34 for driving hydraulic motors 33 simultaneously to power the rear wheels 3 for moving the boat out of the water onto the beach. Simultaneously, the operator will turn steering wheel 18 to steer the front wheel 2 as required.

The rear wheels 3 are located sufficiently far rearwardly of the center of gravity of the boat when they are in their self-propelled position so that a substantial portion of the weight of the boat will be carried by the forward wheel 2. The forward wheel should carry sufficient weight so that this wheel will have adequate traction for steering the boat even when it is climbing a steep bank under the driving power of the rear wheels.

When the boat has thus been beached, the bracket 4 can be attached to the bow of the boat and the boat moved by powered rotation of wheels 3 until the socket of the bracket 4 is directly over the trailer hitch of an automotive vehicle. The jack 12 can then be actuated in a direction to retract plunger 11 which will effect upward and forward swinging of the ground-engaging wheel 2. Because the rear wheels 3 are located rearwardly of the center of gravity of the boat, its bow will descend as the forward wheel 2 is moved toward retracted position, so that the socket of the bracket 4 can settle onto the trailer hitch of the automotive vehicle. The trailer hitch will thus support the bow portion of the boat through the bracket 4 so that the actuator 12 can continue to move the forward ground-engaging wheel 2 into the fully retracted position within the wheel well 5 shown in the dot-dash lines in FIG. 3.

When the bow bracket 4 of the boat has thus been secured to the trailer hitch of the automotive vehicle, the levers 29 can be swung from their full forward, generally horizontal, position, indicated in broken lines in FIG. 6, back to the upwardly and forwardly inclined attitude shown in dot-dash lines in FIG. 6. Such swinging of the rear wheel control levers will swing the rear wheels forward from the solid-line position of FIG. 6 to the dot-dash line position of the same figure. Such shifting of the ground-engaging wheels will lift the stern portion of the boat 1 somewhat higher to increase the ground clearance, while at the same time shifting the rear wheels closer to the center of gravity of the boat so that they will carry more of its weight and reduce the load on the trailer hitch. In this position, however, the rear wheels will still be aft of the center of gravity of the boat. The boat can then be towed by the automotive vehicle in the same manner as a conventional boat trailer is towed.

When it is desired to disengage the boat 1 from an automotive vehicle by which it has been towed and launch it, each lever 29 is first swung from its dot-dash position of FIG. 6, into its forward broken-line position so that each rear wheel 3 will be shifted from its forward dot-dash line position of FIG. 6 into its rearward solid-line position of that figure. Next, the forward wheel actuator 12 is actuated to project the plunger 11 for swinging the front wheel from the dot-dash retracted line position, shown in FIG. 3, toward the solid-line ground-engaging position of that figure. By such movement, the socket of the bow bracket 4 can be raised off the trailer hitch of the automotive vehicle to separate the boat from such vehicle.

The bow bracket 4 can now be removed from the bow of the boat and the boat driven as a self-propelled vehicle into the water. The rear wheels 3 can be provided with suitable brakes or the hydraulic line connecting the hydraulic motors 33 and the pump 34 can be provided with a controllable restriction to regulate flow through the line so as to provide braking force on the friction gear drive wheels 31 to retard rotation of the ground-engaging wheels 3 during such launching. When the boat is afloat, the levers 29 can be swung from the dot-dash line position of FIG. 6 to the broken-line position of FIG. 5 to move the rear wheels 3 into the retracted full-line position of FIG. 5.

The jack 12 may now be actuated to retract plunger 11 for swinging horn 10 rearwardly, thus swinging the forward wheel strut 6 and wheel 2 into the dot-dash position of FIG. 3 retracted into the bow wheel well 5. The boat will then be in condition for water use.

If desired, the boat hull 1 can be constructed without a keel to increase its ground clearance when it is supported by the wheeled undercarriage. To increase the directional stability of the boat and to deter skidding in turns, a skid fin 36 may be mounted on the outer end of each strut axle 28 projecting substantially radially from such axle in a direction generally opposite the direction in which the wheel strut 27 projects from the axle. Such skid fins will be swung as such axles are rotated so that the skid fins will be in the solid-line positions of FIGS. 6 and 7 retracted into the wheel wells 26 when the ground-engaging wheels are projected. When the ground-engaging wheels are swung into their retracted positions within the wheel wells, as shown in FIG. 5, the skid fins will be projected downwardly so that their lower portions extend below the bottom of the hull, as shown in FIG. 5.

I claim:

1. A wheeled boat comprising a boat hull, front retractable wheel means for supporting the forward portion of the boat hull, rear wheel means, means mounting said rear wheel means for movement between an upper retracted postion, a lower forward ground-engaging load-supporting position, located a short distance aft of the center of gravity of the boat hull for supporting said boat hull to be towed when said front wheel means is in retracted position, and a lower rear ground-engaging load-supporting position, located farther aft of the center of gravity of the boat hull than the forward ground-engaging load-supporting position of said rear wheel means when said front wheel means is in ground-engaging position for supporting said boat hull in conjunction with said front wheel means to be self-propelled, and drive means for driving said rear wheel means to propel said boat hull along the ground when said rear wheel means is in its rear ground-engaging position, 2. The wheeled boat defined in claim 1, in which the drive means includes a powered friction gear drive engageable with the rear wheel means by movement of the rear wheel means relative to the boat hull into the rear ground-engaging position.

3. The wheeled boat defined in claim 2, the rear wheel means being free-wheeling in its lower forward ground-engaging position, and being engaged with the friction gear drive in the rear ground-engaging position.

4. The wheeled boat defined in claim 2, and hydraulic drive means for driving the friction gear drive.

5. The wheeled boat defined in claim 1, a rotatable axle mounted in the boat hull, a swingable strut projecting substantially radially from said axle and carrying the rear wheel means, means guiding said axle for rotation for swinging of said strut between a forwardly and upwardly swung position in which the rear wheel means are retracted, a position inclined downwardly and forwardly from said axle in which the rear wheel means are in their forward ground-engaging load-supporting position, and a position inclined downwardly and rearwardly from said axle in which the rear wheel means are in their lower rear ground-engaging load-supporting position, and means for holding said axle and said strut means to maintain the rear wheel means in its lower forward ground-engaging load-supporting position for supporting the weight of the boat hull to be towed and for holding said axle and said strut means to maintain the rear wheel means in its lower rear ground-engaging load-supporting position for supporting weight of the boat hull for self-propulsion.

6. The wheeled boat defined in claim 5, and a skid fin carried by the axle, projecting generally radially therefrom and spaced from the swingable strut circumferentially of the axle, rotation of the axle simultaneously swinging the swingable strut to retract the rear wheel means from ground-engaging position and swinging said skid fin to project below the bottom of the boat hull.

* * * * *

UNITED STATES PATENT OFFICE
CERTIFICATE OF CORRECTION

Patent No. 3,755,835      Dated September 4, 1973

Inventor(s) Harry R. Boersig

It is certified that error appears in the above-identified patent and that said Letters Patent are hereby corrected as shown below:

Column 6, line 42, change the comma to a period; line 54, after the comma insert --said mounting means including--.

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents